US011359712B2

(12) United States Patent
Kimura et al.

(10) Patent No.: US 11,359,712 B2
(45) Date of Patent: Jun. 14, 2022

(54) INTERNAL-PRESSURE RISE PREVENTION STRUCTURE OF SPEED REDUCER

(71) Applicant: NABTESCO CORPORATION, Tokyo (JP)

(72) Inventors: Shunsuke Kimura, Tokyo (JP); Shuichi Kamagata, Tokyo (JP); Yokon Oh, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 49 days.

(21) Appl. No.: 16/850,772

(22) Filed: Apr. 16, 2020

(65) Prior Publication Data

US 2020/0370636 A1 Nov. 26, 2020

(30) Foreign Application Priority Data

May 23, 2019 (JP) .............................. JP2019-096989

(51) Int. Cl.
| | |
|---|---|
| *B25J 17/00* | (2006.01) |
| *B25J 17/02* | (2006.01) |
| *B25J 18/00* | (2006.01) |
| *F16H 57/027* | (2012.01) |
| *F16H 57/021* | (2012.01) |
| *F16H 57/029* | (2012.01) |
| *F16H 57/04* | (2010.01) |
| *F16K 15/02* | (2006.01) |
| *F16H 1/32* | (2006.01) |
| *F16H 57/02* | (2012.01) |

(52) U.S. Cl.
CPC ........ *F16H 57/027* (2013.01); *B25J 17/0241* (2013.01); *F16H 57/021* (2013.01); *F16H 57/029* (2013.01); *F16H 57/0406* (2013.01); *F16H 57/0436* (2013.01); *F16K 15/026* (2013.01); *F16H 1/32* (2013.01); *F16H 2057/02034* (2013.01)

(58) Field of Classification Search
CPC .. F16H 57/027; B25J 19/0062; B25J 19/0079
See application file for complete search history.

(56) References Cited

U.S. PATENT DOCUMENTS

| | | | |
|---|---|---|---|
| 3,184,985 | A | 5/1965 | Dreitzler |
| 4,040,312 | A | 8/1977 | Tappan et al. |
| | | (Continued) | |

FOREIGN PATENT DOCUMENTS

| | | |
|---|---|---|
| CN | 208858871 U | 5/2019 |
| JP | 6362559 B2 | 7/2018 |

OTHER PUBLICATIONS

Extended European Search Report dated Sep. 22, 2020 issued in corresponding European Patent Application No. 20169653.1 (9 pgs.).

*Primary Examiner* — Jake Cook
(74) *Attorney, Agent, or Firm* — Pillsbury Winthrop Shaw Pittman, LLP

(57) ABSTRACT

An internal-pressure rise prevention structure of a speed reducer according to the invention includes a speed reduction mechanism that decelerates rotation of an input part and transmits the decelerated rotation to an output part, and a container having a communication hole formed in a wall surface that defines an internal space for accommodating the speed reduction mechanism and lubricant. The communication hole is situated vertically above the level of the lubricant.

10 Claims, 16 Drawing Sheets

(56) References Cited

U.S. PATENT DOCUMENTS

| | | | |
|---|---|---|---|
| 5,469,950 A | 11/1995 | Lundstrom et al. | |
| 5,718,650 A | 2/1998 | Smith et al. | |
| 2010/0032242 A1* | 2/2010 | Lin | F16K 17/0406 |
| | | | 184/6.12 |
| 2014/0034422 A1* | 2/2014 | Collmer | F16H 57/027 |
| | | | 184/106 |
| 2017/0312924 A1* | 11/2017 | Kinoshita | B25J 17/00 |
| 2017/0335923 A1* | 11/2017 | Smith | A01G 25/09 |
| 2019/0264795 A1* | 8/2019 | Nakayama | F16K 17/06 |

* cited by examiner

INTERNAL-PRESSURE RISE PREVENTION STRUCTURE OF SPEED REDUCER

CROSS-REFERENCE TO RELATED APPLICATIONS

This application is based on and claims the benefit of priority from Japanese Patent Application No. 2019-096989 (filed on May 23, 2019), the contents of which are hereby incorporated by reference in their entirety.

TECHNICAL FIELD

The present invention relates to an internal pressure rise prevention structure of a speed reducer.

BACKGROUND

There has been known a reducer that reduces the number of rotations of a motor shaft or the like and transmits the reduced rotations to an output shaft. A typical reducer has an internal space where a speed reduction mechanism including gears is accommodated with lubricant. The reducer further has a seal member disposed between a pair of components that rotate relative to each other in order to prevent leakage of the lubricant. The seal member is disposed, for example, between the output shaft and a casing that rotatably supports the output shaft. The seal member slidably contacts the output shaft or the casing when the reducer operates.

When a speed of rotation input to the reducer increases, the internal pressure of the reducer may increase as temperature of the reducer rises. A surface pressure of the seal member increases when the internal pressure of the reducer increases, so that a contact area of the seal member increases and a sliding resistance of the seal member increases. Consequently, an energy loss of the reducer increases. In addition, wearing speed of the sealing member may increase and its sealing performance may be deteriorated.

The present invention provides an internal-pressure rise prevention structure of a speed reducer that can curb a rise in the internal pressure of the reducer.

SUMMARY

An internal-pressure rise prevention structure of a speed reducer according to one aspect of the invention includes a speed reduction mechanism that decelerates rotation of an input part and transmits the decelerated rotation to an output part, and a container having a communication hole formed in a wall surface that defines an internal space for accommodating the speed reduction mechanism and lubricant. The communication hole is situated vertically above the level of the lubricant.

The internal-pressure rise prevention structure of the speed reducer according to one aspect enables degassing the internal space through the communication hole while preventing the leakage of the lubricant from the communication hole, and the internal pressure rise of the speed reducer can be reduced. In this way, it is possible to provide the feature of preventing a rise in the internal pressure of the reducer.

The internal-pressure rise prevention structure of the speed reducer according to the aspect may further include a bearing attached on an inner peripheral side of the container, a first member supported by the container via the bearing, a second member forming a part of the container and is rotatable relative to the first member about an axis extending in a vertical direction, and a seal member disposed between the first member and the second member vertically above the bearing. The communication hole may be disposed in the second member and between the bearing and the seal member.

The internal-pressure rise prevention structure of the speed reducer according to the aspect may further include a first member supported by the container such that the first member is relatively rotatable about an axis extending in a horizontal direction, and a second member forming a part of the container.

The internal-pressure rise prevention structure of the speed reducer according to the aspect may further include a valve attached in the communication hole, and a spring biasing the valve in a valve closing direction.

In the internal-pressure rise prevention structure of the speed reducer according to the aspect, the spring may be disposed within the communication hole.

The internal-pressure rise prevention structure of the speed reducer according to the aspect may further include a cover enclosing an opening of the valve.

The internal-pressure rise prevention structure of the speed reducer according to the aspect may further include an absorber disposed on an inner surface of the cover to absorb the lubricant.

The internal-pressure rise prevention structure of the speed reducer according to the aspect may further include a tray disposed vertically below the cover.

The internal-pressure rise prevention structure of the speed reducer according to the aspect may further include an accumulator attached in the communication hole.

In the internal-pressure rise prevention structure of the speed reducer according to the aspect, the accumulator may include a pipe member that is flexible and coupled to the communication hole.

The internal-pressure rise prevention structure of the speed reducer according to the aspect may further include an outer cylinder that is included in the container and rotatably supports the output part on an outer peripheral side of the output part, and a motor driving the input part. The container may include a motor housing for the motor, the motor housing is coupled to the outer cylinder, and the communication hole may be provided in the motor housing.

In the internal-pressure rise prevention structure of the speed reducer according to the aspect, the container may include a robot arm attached to the output part, and the communication hole may be disposed in the robot arm.

According to the aspect of the invention, it is possible to curb a rise in the internal pressure of the speed reducer.

DESCRIPTION OF THE PREFERRED EMBODIMENTS

Figure 1:
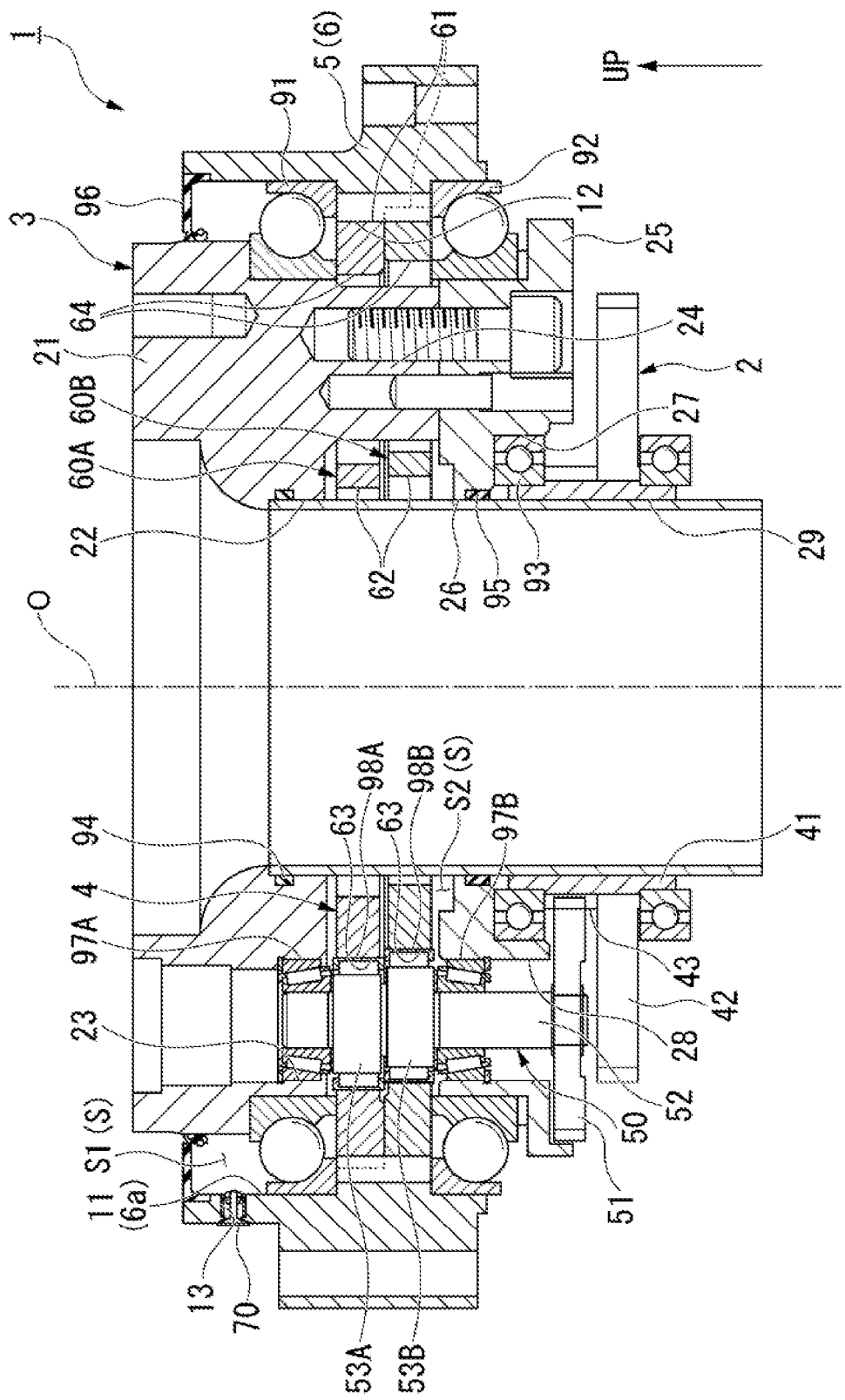
FIG. 1 is a sectional view of a speed reducer according to a first embodiment of the invention.

Embodiments of a speed reducer 1 with an internal-pressure rise prevention structure according to the invention will now be described with reference to the attached drawings. The reducer 1 of the embodiments is an eccentric oscillating gear transmission device used for, for example, a drive unit of a turntable, a joint of a robot arm, and the like. Reference characters designating corresponding components are repeated as necessary throughout the Figures and hereunder description for the sake of consistency and clarity. Thus, description of the same component will not be herein repeated. In addition, upper and lower directions in the following description correspond to the vertical direction, and the arrow UP in the Figures indicates the vertically upward direction.

First Embodiment

FIG. 1 is a sectional view of a speed reducer according to a first embodiment of the invention. As shown in FIG. 1, the reducer 1 includes a central gear 2 as an input part, a carrier 3 (first member) as an output part, a speed reduction mechanism 4 that decelerates rotation of the central gear 2 and transmits the decelerated rotation to the carrier 3, and an outer cylinder 5 (second member) that accommodates the speed reduction mechanism 4. The reducer 1 is an eccentric oscillating gear transmission device in which the central gear 2 is rotated relative to the outer cylinder 5 and the carrier 3 is rotated relative to the outer cylinder 5 so as to obtain an output rotation reduced from the input rotation of the central gear 2.

The speed reducer 1 as a whole is formed in a cylindrical shape with the rotation axis O of the output part (carrier 3) as a center. The rotation axis O extends in the vertical direction. The reducer 1 has an internal space S where the speed reduction mechanism 4 and lubricant that lubricates a sliding portion of the speed reduction mechanism 4 are accommodated. In the following description, a direction along the rotation axis O is referred to as an axial direction, a direction orthogonal to the rotation axis O and extending radially from the rotation axis O is referred to as a radial direction, and a direction circling around the rotation axis O is referred to as a circumferential direction. Further, an "outer side of the device" used hereunder means the side closer to an external space outside the reducer with reference to any position in the internal space of the reducer in which the lubricant is stored. An "inner side of the device" hereunder means a direction opposite to the "outer side of the device."

The outer cylinder 5 is a part of a container 6 having the internal space S. The container 6 used herein is a term collectively referring to members having a wall surface 6a that defines the internal space S. Accordingly, when a part of the wall surface 6a defining the internal space S is formed in an element coupled to the speed reducer 1, the container 6 includes not only the components of the reducer 1 but also the element coupled to the reducer 1. The outer cylinder 5 is formed in a cylindrical shape about the rotation axis O. An outer peripheral surface of the outer cylinder 5 forms an outer periphery of the reducer 1. An inner peripheral surface 11 of the outer cylinder 5 is a part of the wall surface 6a that defines the internal space S.

The outer cylinder 5 has internal teeth 12 and a communication hole 13. The internal teeth 12 are arranged on the entire inner peripheral surface 11 of the outer cylinder 5. The internal teeth 12 are arranged at an axially intermediate portion of the inner peripheral surface 11 of the outer cylinder 5. Note that the term "intermediate" used in this embodiment encompasses not only the center between two ends of a subject, but also an area between the two ends of the subject. The communication hole 13 opens in the inner peripheral surface 11 and the outer peripheral surface of the outer cylinder 5 so that the internal space S communicates with the external space outside the reducer 1. The communication hole 13 allows fluid contained in the internal space S to flow therethrough when the internal pressure of the reducer 1 changes. Where the communication hole 13 should be formed will be described later.

A pair of main bearings 91 and 92 is attached to the inner periphery of the outer cylinder 5. The main bearings 91 and 92 are disposed apart from each other in the axial direction. The main bearings 91 and 92 are a first main bearing 91 disposed on a first axial side (upper in the embodiment) and a second main bearing 92 disposed on a second axial side (lower in the embodiment). The main bearings 91 and 92 are arranged so as to sandwich the internal teeth 12 from both sides in the axial direction. The outer cylinder 5 rotatably supports the carrier 3 on the outer peripheral side of the carrier 3 via the pair of main bearings 91 and 92.

The carrier 3 serves as an output shaft on which a driven part is attached. The carrier 3 as a whole is formed in a cylindrical shape around the rotation axis O. The carrier 3 is disposed inside the outer cylinder 5. Between the carrier 3 and the outer cylinder 5, a first annular space S1, which is a part of the internal space S, is provided. The carrier 3 protrudes from the outer cylinder 5 on both sides in the axial direction. The pair of main bearings 91 and 92 described above are attached to the outer periphery of the carrier 3. The carrier 3 rotates relative to the outer cylinder 5 about the rotation axis O. The carrier 3 includes a base portion 21, a plurality (three in the embodiment) of shaft portions 24, an end plate portion 25, and an inner cylindrical portion 29.

The base portion 21 is disposed on the first axial side with respect to the internal teeth 12 of the outer cylinder 5. The base portion 21 is formed in a disk shape about the rotation axis O. The base portion 21 is supported by the outer cylinder 5 via the first main bearing 91. The base portion 21 has, in its central portion, a through hole 22 formed coaxially with the rotation axis O. Further, around the through hole 22, the base portion 21 has the same number of crankshaft attachment holes 23 as a plurality of (three in the embodiment) crankshafts 50 which will be described later. The plurality of crankshaft attachment holes 23 are arranged at equal intervals in the circumferential direction.

The plurality of shaft portions 24 are provided integrally with the base portion 21. The plurality of shaft portions 24 extend from the main surface of the base portion 21 facing the second axial direction toward the second axial direction. The plurality of shaft portions 24 are arranged at equal intervals in the circumferential direction.

The end plate portion 25 is disposed on the second axial side with respect to the internal teeth 12 of the outer cylinder 5. In other words, the end plate portion 25 is arranged on the second axial side apart from the base portion 21. Thus, a second annular space S2 forming a part of the internal space S and that is disposed next to the first annular space S1 is formed between the base portion 21 and the end plate portion 25. The end plate portion 25 is supported by the outer cylinder 5 via the second main bearing 92. The end plate portion 25 is fastened to the ends on the second axial side of the plurality of shaft portions 24, and is integrated with the base portion 21 and the plurality of shaft portions 24. The end plate portion 25 has a through hole 26 and a central recess 27. The through hole 26 is formed coaxially with the rotation axis O in the central area of the end plate portion 25. The central recess 27 is formed at the center of an end surface opposite to the base portion 21. A bearing 93 that supports the central gear 2 is disposed in the central recess 27. The through hole 26 opens in the bottom surface of the central recess 27. The end plate portion 25 has the same number of crankshaft attachment holes 28 as the plurality of crankshafts 50 around the through hole 26. The plurality of crankshaft attachment holes 28 are arranged at equal intervals in the circumferential direction. The plurality of crankshaft attachment holes 28 are disposed at positions corresponding to the plurality of crankshaft attachment holes 28 in the base portion 21.

The inner cylindrical portion 29 is formed in a cylindrical shape with the rotation axis O as the center. The inner cylindrical portion 29 is provided to span from the inside of the through hole 22 of the base portion 21 to the inside of the through hole 26 in the end plate portion 25, and is fixed to the base portion 21 and the end plate portion 25. The inner cylindrical portion 29 surrounds the second annular space S2 between the base portion 21 and the end plate portion 25 from the radially inside. That is, the outer peripheral surface of the inner cylindrical portion 29 is a part of the wall surface 6a that defines the internal space S. The inner cylindrical portion 29 protrudes from the end plate portion 25 toward the side opposite to the base portion 21. An O-ring 94 is disposed between the outer peripheral surface of the inner cylindrical portion 29 and the inner peripheral surface of the through hole 22 in the base portion 21. An O-ring 95 is disposed between the outer peripheral surface of the inner cylindrical portion 29 and the inner peripheral surface of the through hole 26 in the end plate portion 25. The O-rings 94 and 95 seal the second annular space S2 and fix the base portion 21 and the end plate portion 25 to the inner cylindrical portion 29 by friction.

An oil seal 96 (seal member) is disposed between the outer cylinder 5 and the carrier 3. The oil seal 96 is formed in an annular shape around the rotation axis O, and is in close contact with both the inner peripheral surface 11 of the outer cylinder 5 and the outer peripheral surface of the base portion 21 over the entire circumference. Specifically, the oil seal 96 is disposed to extend longer toward the outside of the device (first axial side) than the first main bearing 91. In the embodiment, the oil seal 96 contacts an end of the inner peripheral surface 11 of the outer cylinder 5 on the first axial direction and an intermediate portion of the outer peripheral surface of the base portion 21 in the axial direction. The oil seal 96 seals the first annular space S1 from the first axial side.

The central gear 2 serves as an input part to which a driving force of a motor (not shown) is input. The central gear 2 is disposed on a side of the end plate portion 25 of the carrier 3 opposite to the base portion 21. The central gear 2 includes a cylindrical tube 41, and a driven gear 42 and a transmission gear 43 that are arranged on the outer peripheral surface of the tube 41. The tube 41 extends in the axial direction with the rotation axis O as a center. The inner cylindrical portion 29 is inserted inside the tube 41. The inner diameter of the tube 41 is larger than the outer diameter of the inner cylindrical portion 29. Thus a gap is provided between the inner peripheral surface of the tube 41 and the outer peripheral surface of the inner cylindrical portion 29, so that the tube 41 and the inner cylindrical portion 29 can be relatively rotated. An end of the tube 41 situated closer to the end plate portion 25 in the axial direction enters the central recess 27 in the end plate portion 25 and is supported by the end plate portion 25 via the bearing 93.

The driven gear 42 is disposed on the opposite side to the end plate 25 with respect to the bearing 93 and is spaced apart from the bearing 93 in the axial direction. The driven gear 42 meshes with a gear (not shown) driven by the motor. The transmission gear 43 disposed adjacent to the driven gear 42 between the bearing 93 and the driven gear 42. The transmission gear 43 has a smaller diameter than the driven gear 42.

The speed reduction mechanism 4 includes a plurality (three in the embodiment) of crankshafts 50 rotatably supported by the carrier 3, a plurality of crankshaft gears 51 coupled to the crankshaft 50, a first oscillating gear 60A and a second oscillating gear 60B attached to the crankshafts 50, and the above-described inner teeth 12 of the outer cylinder 5. The number of crankshaft gears 51 is same as the number of the crankshafts 50.

The plurality of crankshafts 50 are arranged at equal intervals in the circumferential direction on the inner side of the outer cylinder 5. Each of the crankshafts 50 is rotatably supported by the carrier 3 via a pair of crankshaft bearings 97A, 97B. Specifically, each crankshaft 50 is rotatably supported by the base portion 21 via the first crankshaft bearing 97A inside the crankshaft attachment hole 23 of the base portion 21, and is rotatably supported by the end plate portion 25 via the second crankshaft bearing 97B inside the crankshaft attachment hole 28 of the end plate portion 25.

Each crankshaft 50 includes a shaft main body 52 and a pair of eccentric portions 53A and 53B formed integrally with the shaft main body 52. The shaft main body 52 is supported by the pair of crankshaft bearings 97A and 97B. The shaft main body 52 protrudes from the end plate portion 25 to the side opposite to the base portion 21. The pair of eccentric portions 53 are disposed at an intermediate portion of the shaft main body 52. The pair of eccentric portions 53 are arranged in the axial direction between the pair of crankshaft bearings 97A and 97B. The pair of eccentric portions 53A and 53B are a first eccentric portion 53A situated closer to the first crankshaft bearing 97A and a second eccentric portion 53B situated closer to the second crankshaft bearing 97B. The eccentric portions 53 in the pair is each formed in a columnar shape. Each eccentric portion 53 projects from the shaft main body 52 and is disposed eccentrically with respect to the axis of the shaft main body 52. The pair of eccentric portions 53 are eccentric from the axis of the shaft main body 52 by the same eccentric amount. The pair of eccentric portions 53 are disposed so as to have a phase difference of a predetermined angle (180° in the embodiment) from each other.

The plurality of crankshaft gears 51 are attached respectively to the ends on the second axial side of the corresponding crankshafts 50 (the shaft main body 52). The crankshaft gear 51 meshes with the transmission gear 43 of the central gear 2. Thus the crankshaft gear 51 rotates as the central gear 2 rotates relative to the carrier 3 that supports the plurality of crankshafts 50.

The first oscillating gear 60A is disposed in the second annular space S2. The first oscillating gear 60A is formed in a disk shape having an outer diameter smaller than the inner diameter of the internal teeth 12 of the outer cylinder 5. The first oscillating gear 60A includes external teeth 61, a central through hole 62, a plurality of crankshaft insertion holes 63 as many as the plurality of crankshafts 50, and a plurality of shaft portion insertion holes 64 as many as the plurality of shaft portions 24. The external teeth 61 are arranged along the entire outer peripheral surface of the first oscillating gear 60A, and configured to mesh with the internal teeth 12 of the outer cylinder 5. The central through hole 62 is formed at the center of the first oscillating gear 60A. The inner cylindrical portion 29 is inserted in the central through hole 62 with a gap therebetween. The plurality of crankshaft insertion holes 63 are arranged around the center through hole 62. The plurality of crankshafts 50 are inserted respectively into the corresponding crankshaft insertion holes 63. The first eccentric portion 53A of the crankshaft 50 is disposed inside the crankshaft insertion hole 63. The plurality of shaft insertion holes 64 are disposed around the central through hole 62. The plurality of shaft portions 24 are inserted respectively into the corresponding shaft portion insertion holes 64 with a gap provided therebetween.

The second oscillating gear 60B is disposed between the first oscillating gear 60A and the end plate 25 in the second annular space S2. The second oscillating gear 60B is formed in the same manner as the first oscillating gear 60A, and includes external teeth 61, a central through hole 62, a plurality of crankshaft insertion holes 63, and a plurality of shaft portion insertion holes 64. The inner cylindrical portion 29 is inserted in the central through hole 62 with a gap therebetween. The plurality of crankshafts 50 are inserted respectively into the corresponding crankshaft insertion holes 63. The second eccentric portion 53B of the crankshaft 50 is disposed inside the crankshaft insertion hole 63. The plurality of shaft portions 24 are inserted respectively into the corresponding shaft portion insertion holes 64 with a gap provided therebetween.

The first oscillating gear 60A is attached to the first eccentric portion 53A of the crankshaft 50 via a first roller bearing 98A disposed inside each crankshaft insertion hole 63. When each crankshaft 50 rotates and the first eccentric portion 53A eccentrically rotates, the first oscillating gear 60A oscillates and rotates about the rotation axis O as it meshes with the internal teeth 12 of the outer cylinder 5 in conjunction with the eccentric rotation of the first eccentric portion 53A. The second oscillating gear 60B is attached to the second eccentric portion 53B of the crankshaft 50 via a second roller bearing 98B disposed inside each crankshaft insertion hole 63. When each crankshaft 50 rotates and the second eccentric portion 53B eccentrically rotates, the second oscillating gear 60B oscillates and rotates about the rotation axis O as it meshes with the internal teeth 12 of the outer cylinder 5 in conjunction with the eccentric rotation of the second eccentric portion 53B. Thus the plurality of crankshafts 50 supported by the first oscillating gear 60A and the second oscillating gear 60B orbit around the rotation axis O, and the carrier 3 supporting the plurality of crankshafts 50 rotates about the rotation axis O.

Although not shown, a motor housing that houses the motor is fixed to the outer cylinder 5. The motor housing seals the first annular space S1 from the side opposite to the oil seal 96.

Figure 2:
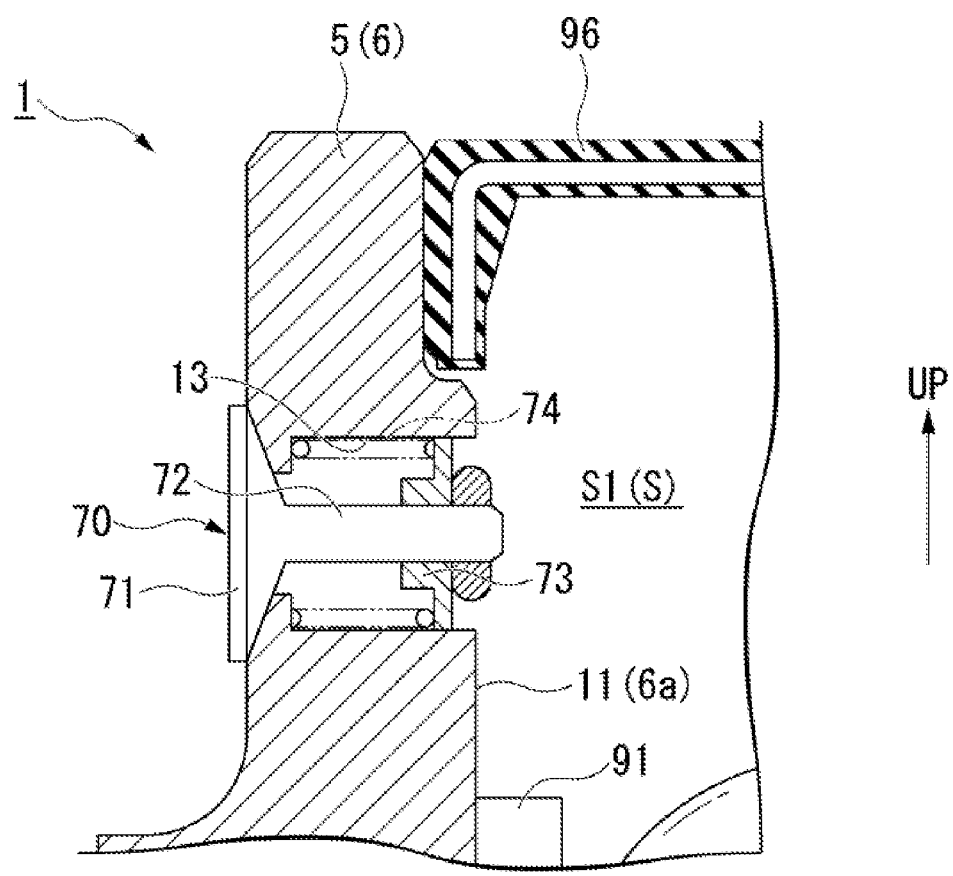
FIG. 2 is an enlarged sectional view of a part of the reducer according to the first embodiment.

FIG. 2 is an enlarged sectional view of a part of the reducer according to the first embodiment. As shown in FIG. 2, the speed reducer 1 includes a valve 70 that moderates a pressure increase in the internal space S. The valve 70 is attached in the above-mentioned communication hole 13 of the outer cylinder 5. The communication hole 13 allows the internal space S to communicate with the external space outside the reducer 1. The communication hole 13 is opened in the inner peripheral surface 11 of the outer cylinder 5 above an oil level (not shown) of the lubricant stored in the internal space S. The communication hole 13 is disposed above the pair of main bearings 91 and 92. More specifically, the communication hole 13 is provided between the first main bearing 91 and the oil seal 96 in the outer cylinder 5 and penetrates the outer cylinder 5 in the horizontal direction.

The valve 70 is a so-called poppet valve, and includes an umbrella-shaped valve body 71 and a stem 72 extending from the valve body 71. The valve body 71 is disposed such that it can close the communication hole 13 from the outer side of the device. The valve body 71 is in close contact with an opening edge of the communication hole 13 over the entire circumference. That is, the outer surface of the outer cylinder 5 serves as a seat for the valve. The stem 72 extends from the valve body 71 toward the inner side of the device, and is disposed inside the communication hole 13. A stopper 73 and a spring 74 are attached to the stem 72. The stopper 73 is fixedly attached to the stem 72 in the communication hole 13. The stopper 73 projects from the stem 72 outward in the radial direction of the stem 72. The spring 74 is a compression coil spring. The spring 74 is disposed so as to surround the stem 72 in the communication hole 13. An end of the spring 74 on the inner side of the device contacts the stopper 73. An end of the spring 74 on the outer side of the device is in contact with a step portion of the inner surface of the communication hole 13. The spring 74 biases the valve 70 via the stopper 73 in a valve closing direction. When the pressure in the internal space S becomes larger than a restoring force of the spring 74, the valve 70 moves in the horizontal direction toward the outer side of the device and opens. Although the whole body of the spring 74 is disposed within the communication hole 13 in the illustrated example, a part of the spring may protrude from the communication hole 13 into the internal space S.

As described above, the internal-pressure rise prevention structure of the speed reducer of the embodiment includes the internal space S accommodating the speed reduction mechanism 4 and the lubricant, and the container 6 (outer cylinder 5) having the communication hole 13 opened above the level of the lubricant in the wall surface 6a that defines the internal space S. This configuration enables degassing the internal space S through the communication hole 13 while preventing the leakage of the lubricant through the communication hole 13, and the internal pressure rise of the speed reducer 1 can be curbed. In this way, it is possible to provide the structure for preventing a rise in the internal pressure of the reducer 1.

Further, the internal-pressure rise preventing structure of the embodiment includes the carrier 3; the first main bearing 91 attached to the outer periphery side of the carrier 3; the outer cylinder 5 that is included in the container 6, supports the carrier 3 via the first main bearing 91, and is rotatable relative to the carrier 3 about the rotation axis O vertically extending; and the oil seal 96 disposed between the carrier 3 and the outer cylinder 5 above the first main bearing 91. The communication hole 13 is provided between the first main bearing 91 and the oil seal 96 in the outer cylinder 5. With this configuration, the internal pressure in the vicinity of the oil seal 96 can be reliably reduced.

Further, the internal-pressure rise prevention structure of the embodiment includes the valve 70 attached in the communication hole 13 and the spring 74 that biases the valve 70 in the valve closing direction. With this configuration, the valve 70 opens when the internal pressure exceeds the restoring force of the spring 74 so that it is prevented that the internal space S and the external space outside the speed reducer 1 communicate with each other through the communication hole 13 while the internal pressure is relatively low. Therefore, it is possible to prevent the entry of foreign matter into the internal space S, and it is possible to more reliably prevent the leakage of the lubricant through the communication hole 13.

The spring 74 is disposed in the communication hole 13. With this configuration, the portion of the spring 74 protruding out from the outer cylinder 5 can be reduced as compared with the case where the whole of the spring is disposed outside the communication hole 13. Therefore, it is possible to suppress an increase in the size of the reducer 1 with the internal-pressure rise suppression mechanism.

Modification Example of First Embodiment

Figure 3:
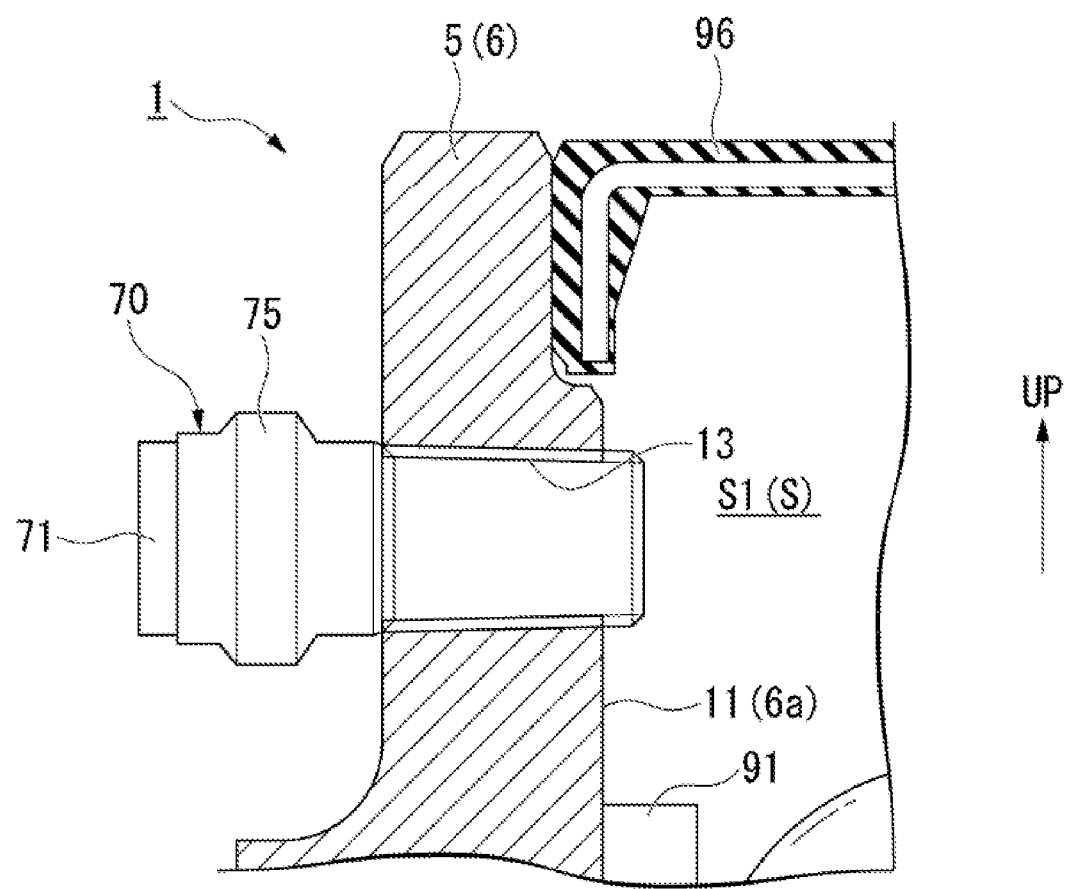
FIG. 3 is an enlarged sectional view of a part of the reducer according to a modification example of the first embodiment.

Although the outer surface of the outer cylinder 5 serves as the seat for the valve 70 in the first embodiment, but the invention is not limited to this. FIG. 3 is an enlarged sectional view of a part of the reducer according to a modification example of the first embodiment. As shown in FIG. 3, the valve 70 may include a valve seat 75 provided separately from the outer cylinder 5. The valve seat 75 is formed in a cylindrical shape with both ends opened, and is inserted into the communication hole 13. As long as the valve seat 75 is in close contact with the inner surface of the communication hole 13 over the entire circumference, and it may be fitted in the communication hole 13 or may be screwed therein. The valve seat 75 protrudes from the outer cylinder 5 toward the outer side of the device. In this embodiment, the valve seat 75 protrudes from the outer cylinder 5 in the horizontal direction. The valve body 71 is in close contact with an opening edge of the valve seat 75 on the outer side of the device over the entire circumference. Although not shown, the stem, the stopper, and the spring are disposed inside the valve seat 75. With this configuration, the communication hole 13 can be formed in a relatively simple shape so that the manufacturing cost of the reducer 1 can be reduced.

Second Embodiment

Figure 4:
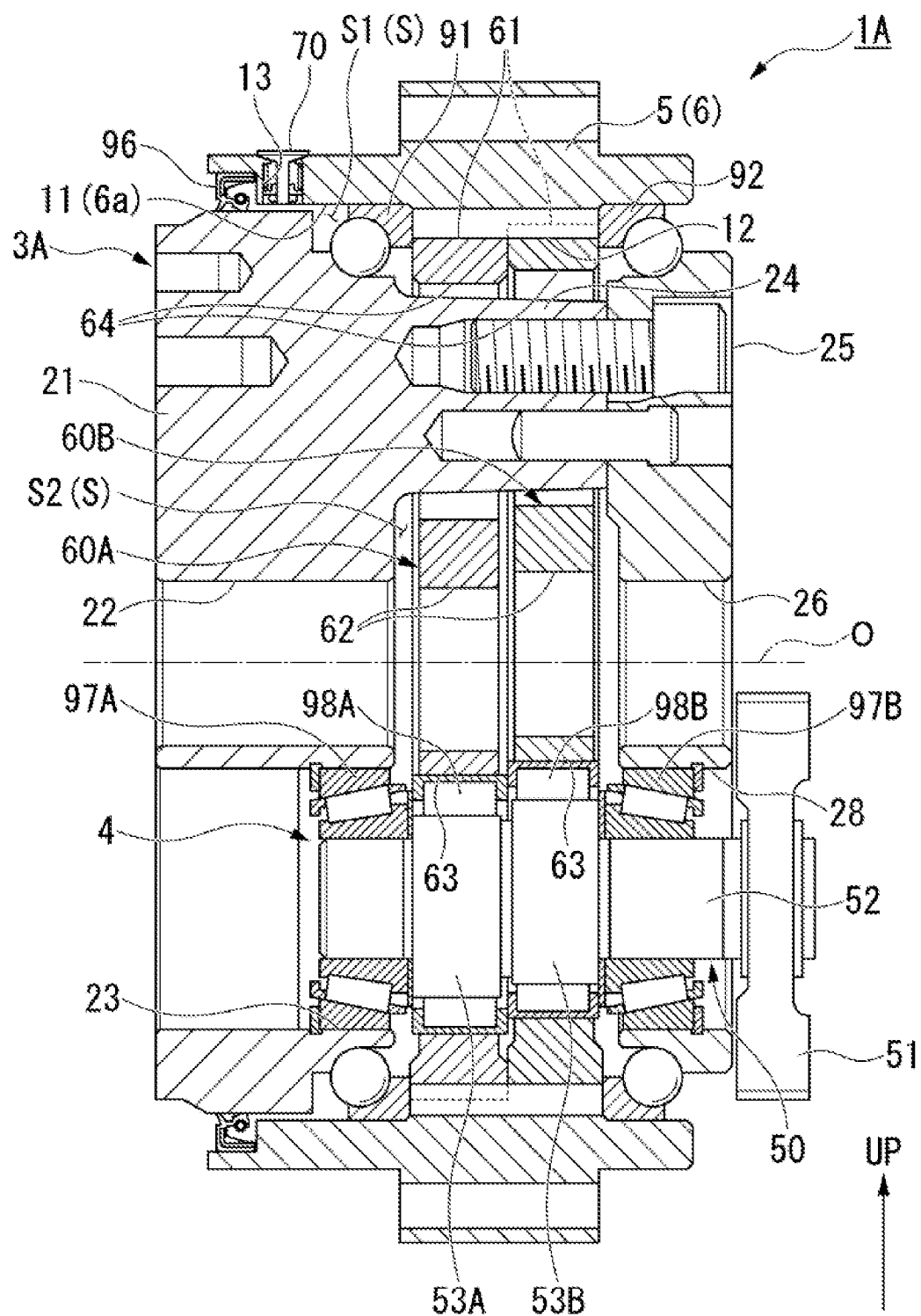
FIG. 4 is a sectional view of a speed reducer according to a second embodiment of the invention.

FIG. 4 is a sectional view of a speed reducer according to a second embodiment of the invention. In the first embodiment shown in FIG. 1, the rotation axis of the output part of the speed reducer 1 extends in the vertical direction. Whereas in the second embodiment shown in FIG. 4, the rotation axis O of the output part extends in the horizontal direction unlike the first embodiment. Further, the second embodiment differs from the first embodiment in that a speed reducer 1A does not include the central gear 2 and the inner cylindrical portion 29, and an input shaft (not shown) driven by the motor meshes with the crankshaft gear 51. Except the features described in detail below, the second embodiment may be configured in the same way as the first embodiment.

As shown in FIG. 4, the reducer 1A includes an input shaft (not shown) as the input part, a carrier 3A (first member) as the output part, the speed reduction mechanism 4 that reduces rotation of the input shaft and transmits the rotation to the carrier 3A, and the outer cylinder that accommodates the speed reduction mechanism 4. The speed reducer 1A as a whole is formed in a cylindrical shape with the rotation axis O of the output part (carrier 3A) as a center. The rotation axis O extends in the horizontal direction. The reducer 1A has the internal space S where the speed reduction mechanism 4 and lubricant that lubricates the sliding portion of the speed reduction mechanism 4 are accommodated. Since the outer cylinder 5 and the speed reduction mechanism 4 are the same as those of the speed reducer 1 of the first embodiment, detailed description will be hereunder omitted.

The carrier 3A is formed in the same manner as the carrier 3 of the first embodiment, except that the carrier 3A does not include the inner cylindrical portion 29. Accordingly the second annular space S2 between the base portion 21 and the end plate portion 25 is opened radially inward and communicates with the space in the through hole 22 of the base portion 21 and the space in the through hole 26 of the end plate portion 25. For example, the space in the through hole 22 of the base portion 21 and the space in the through hole 26 of the end plate portion 25 are sealed by a robot arm and a motor housing of the motor (not shown) attached to the speed reducer 1A.

Figure 5:
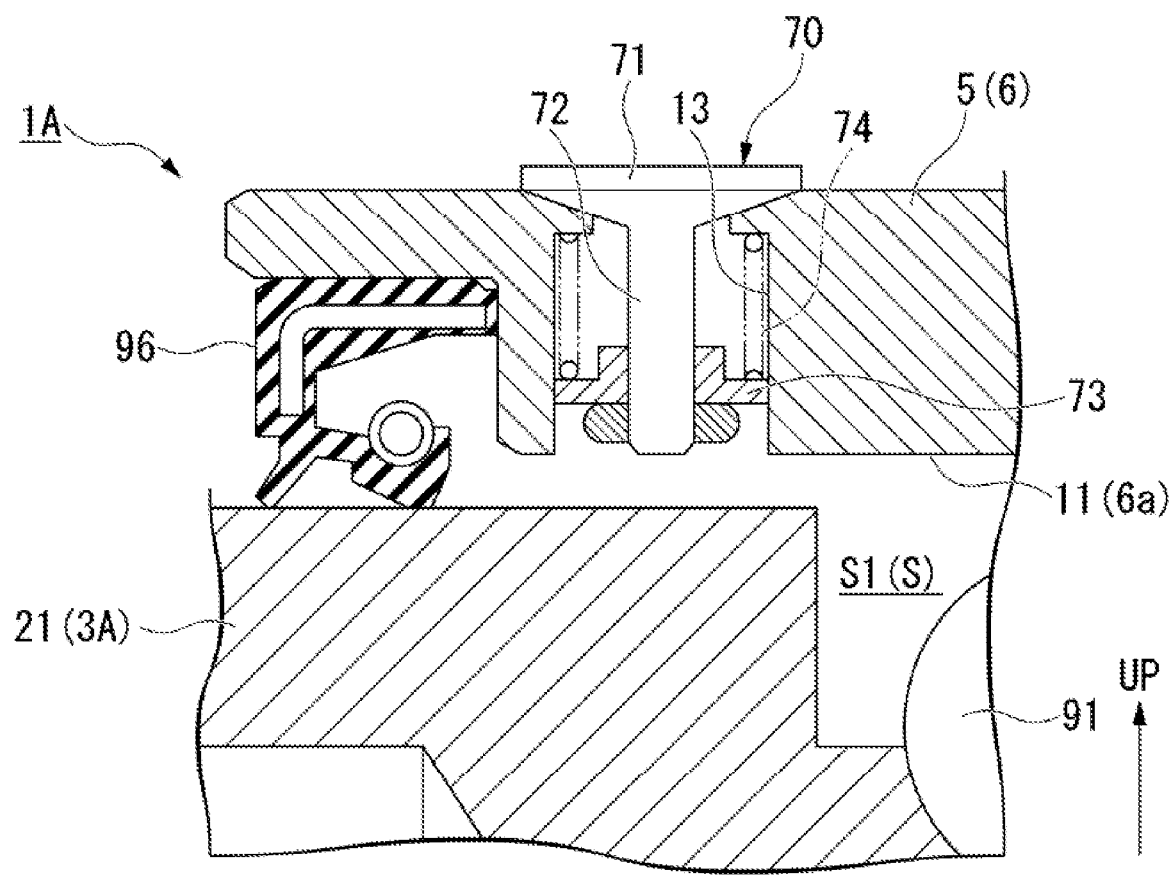
FIG. 5 is an enlarged sectional view of a part of the reducer according to the second embodiment.

FIG. 5 is an enlarged sectional view of a part of the reducer according to the second embodiment. As shown in FIG. 5, the communication hole 13 opens in the inner peripheral surface 11 and the outer peripheral surface of the outer cylinder 5 to allow the internal space S to communicate with the external space outside the reducer 1A. The communication hole 13 is opened in the inner peripheral surface 11 of the outer cylinder 5 above an oil level of the lubricant stored in the internal space S. Specifically, the communication hole 13 is disposed above the carrier 3A in the outer cylinder 5. The communication hole 13 is provided between the first main bearing 91 and the oil seal 96 and penetrates the outer cylinder 5 in the vertical direction. The valve 70 is attached to the communication hole 13 in the same manner as the first embodiment.

The internal-pressure rise prevention mechanism of the speed reducer of the second embodiment described above has the following advantageous effects in addition to the effect same as the first embodiment that the internal pressure rise of the speed reducer 1A can be prevented. The internal pressure rise prevention mechanism of the speed reducer of the second embodiment includes the carrier 3A and the outer cylinder 5 that is included in the housing 6, supports the carrier 3A and is rotatable relative to the carrier 3A about the rotation axis O extending in the horizontal direction. The communication hole 13 is disposed above the carrier 3A in the outer cylinder 5. This configuration enables degassing the internal space S through the communication hole 13 since the communication hole 13 opens in the upper area of the internal space S while preventing the leakage of the lubricant through the communication hole 13.

First Modification Example of Second Embodiment

Figure 6:
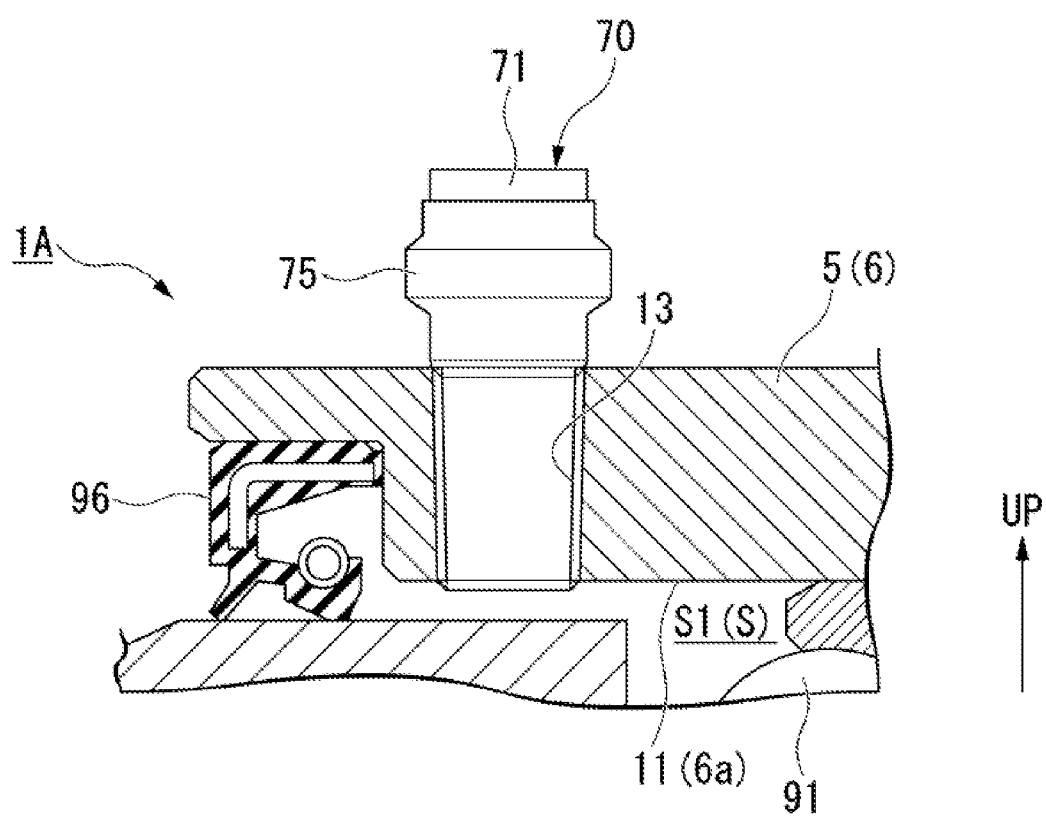
FIG. 6 is an enlarged sectional view of a part of the reducer according to a first modification example of the second embodiment.

FIG. 6 is an enlarged sectional view of a part of the reducer according to a first modification example of the second embodiment. Note that the valve 70 may be configured in the same manner as the modification example of the first embodiment. Specifically, as shown in FIG. 6, the valve 70 may include the valve seat 75 provided separately from the outer cylinder 5. In this case, the valve seat 75 protrudes upward from the outer cylinder 5. When the pressure in the internal space S becomes larger than a restoring force of the spring (not shown), the valve 71 moves upward and opens.

Second Modification Example of Second Embodiment

Figure 7:
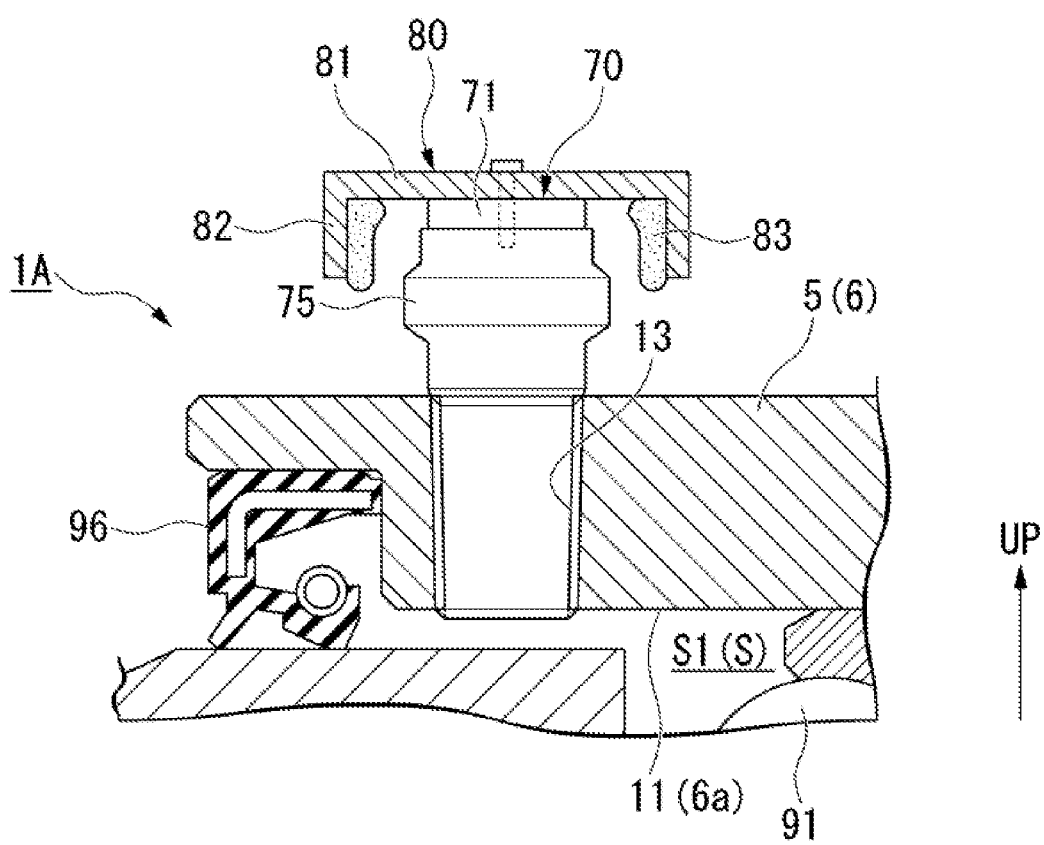
FIG. 7 is an enlarged sectional view of a part of the reducer according to a second modification example of the second embodiment.

FIG. 7 is an enlarged sectional view of a part of the reducer according to a second modification example of the second embodiment. As shown in FIG. 7, a cover 80 that covers an opening of the valve 70 may be attached to the valve 70. The opening of the valve 70 here refers to a gap between the valve body 71 and the valve seat 75 when the valve 70 is opened. The cover 80 includes a top wall portion 81 extending radially outward from the valve body 71 in the radial direction of the valve body 71, a side wall portion 82 extending from an outer edge of the top wall portion 81 toward the valve seat 75 with respect to the valve body 71, and an absorber 83 that can absorb the lubricant.

The top wall portion 81 extends beyond the valve seat 75 when viewed from the moving direction of the valve body 71. For example, the top wall portion 81 is formed in a disk shape and is coupled to the valve body 71. The side wall portion 82 extends from the top wall portion 81 toward the outer cylinder 5 so as to cover the opening of the valve 70 in the moving direction of the valve body 71. The side wall portion 82 extends continuously around the entire periphery of the valve body 71. An inner surface of the side wall portion 82 faces the opening of the valve 70. For example, the side wall portion 82 is formed in a cylindrical shape extending from the outer edge of the top wall portion 81. In the illustrated example, the top wall portion 81 and the side wall portion 82 are integrally formed as a single component. Thus the top wall portion 81 and the side wall portion 82 can be easily formed by press or the like.

The absorber 83 is disposed on the inner surface of the cover 80. The absorber 83 is provided on the inner surface of the side wall portion 82 over the entire periphery. The absorber 83 is supported by the inner surface of the side wall 82. The absorber 83 is disposed so as to cover the opening of the valve 70 in the moving direction of the valve body 71. For example, the absorber 83 is a porous material such as a sponge. The absorber 83 absorbs and holds the lubricant that has been ejected from the opening of the valve 70 when the valve 70 is opened.

As described above, the cover 80 surrounding the opening of the valve 70 is provided in this modification example. With this configuration, even if the jetted gas contains the lubricant when the gas in the internal space S is released through the opening of the valve 70, the cover 80 receives the lubricant, which prevents scattering of the lubricant.

In addition, the absorber 83 capable of absorbing the lubricant is provided on the inner surface of the cover 80. With this configuration, the lubricant received by the cover 80 can be held by the absorber 83. Therefore, outflow of the lubricant leaked from the internal space S can be prevented.

Although the cover 80 is used in a configuration in which the communication hole 13 penetrates the outer cylinder 5 in the vertical direction in this modification example, but the invention is not limited to this. The cover 80 may be also applied to a configuration in which the communication hole 13 penetrates the outer cylinder 5 in a direction other than the vertical direction as in the first embodiment.

Third Modification Example of Second Embodiment

Figure 8:
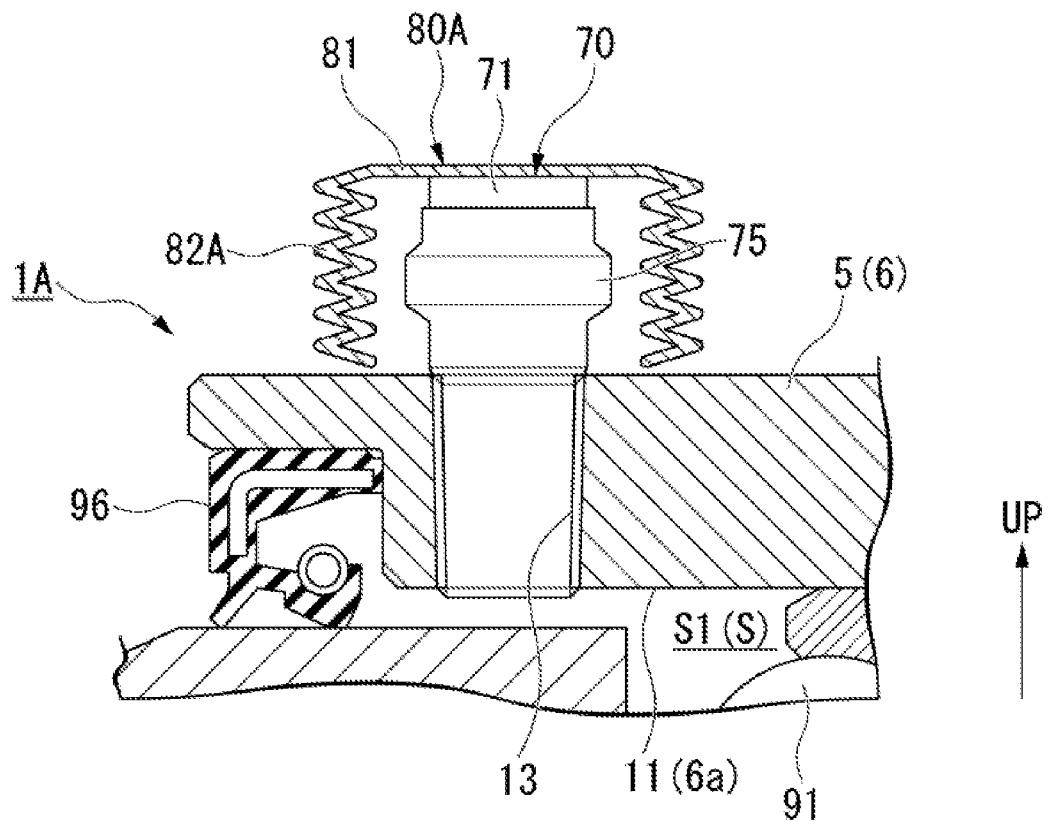
FIG. 8 is an enlarged sectional view of a part of the reducer according to a third modification example of the second embodiment.

FIG. 8 is an enlarged sectional view of a part of the reducer according to a third modification example of the second embodiment. As shown in FIG. 8, the side wall portion 82A of the cover 80A may be formed in a bellows shape. Thus the surface area of the inner surface of the side wall portion 82A is increased, so that the lubricant on the inner surface of the side wall portion 82A can be retained thereon without providing the absorber on the inner surface of the side wall portion 82A.

Fourth Modification Example of Second Embodiment

Figure 9:
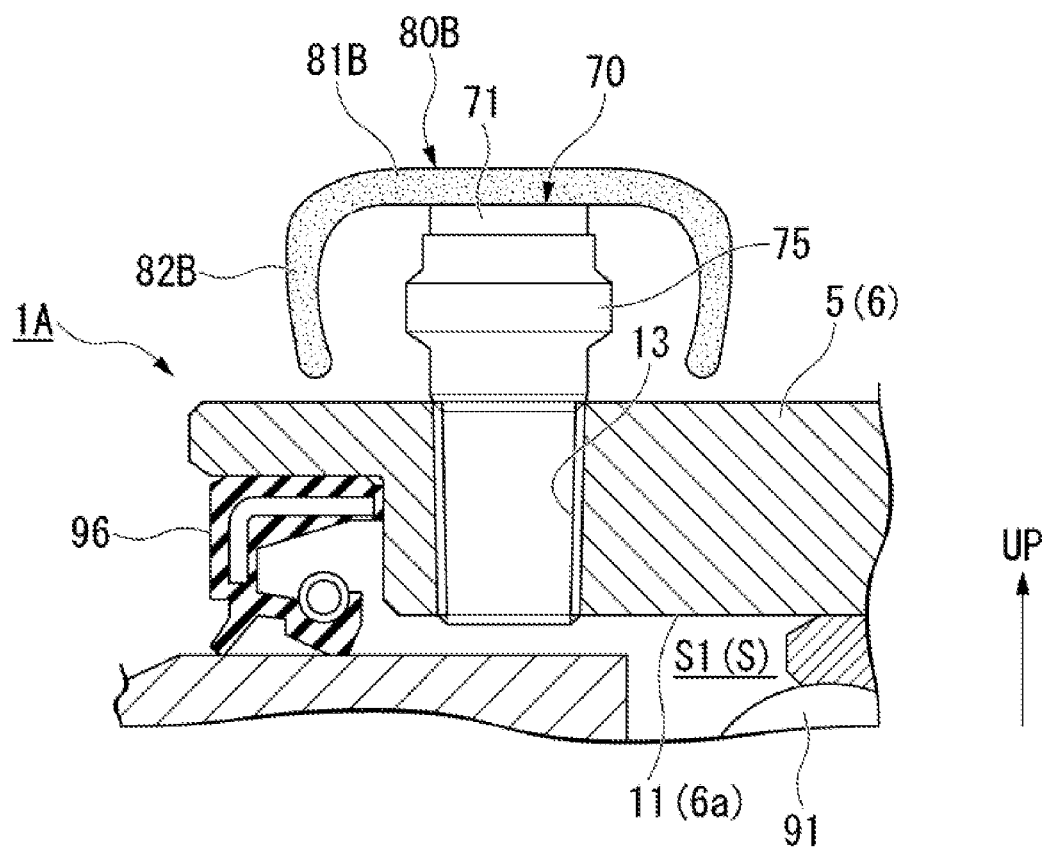
FIG. 9 is an enlarged sectional view of a part of the reducer according to a fourth modification example of the second embodiment.

FIG. 9 is an enlarged sectional view of a part of the reducer according to a fourth modification example of the second embodiment. As shown in FIG. 9, a top wall portion 81B and a side wall portion 82B of a cover 80B may be formed of an absorbing material. Thus, a large volume of the absorbing material can be secured while suppressing an increase in the size of the cover 80B itself, so that it is possible to increase the amount of lubricant absorbed thereby.

Fifth Modification Example of Second Embodiment

Figure 10:
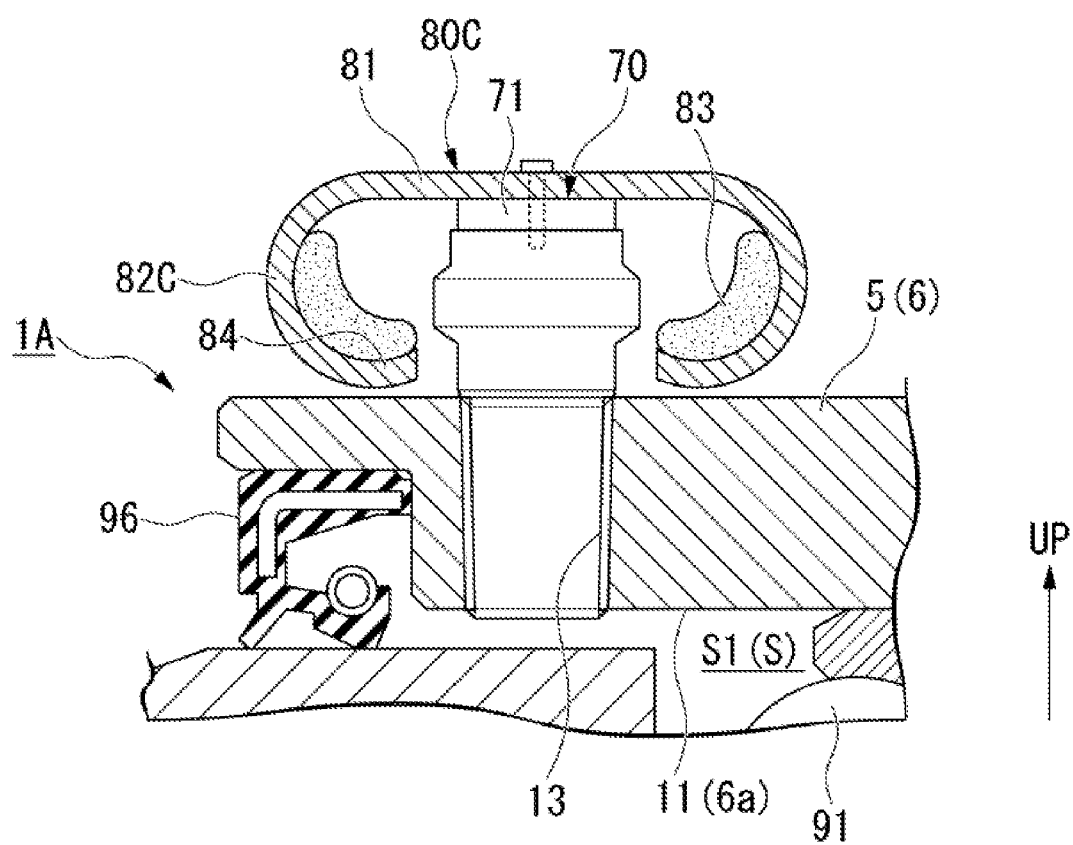
FIG. 10 is an enlarged sectional view of a part of the reducer according to a fifth modification example of the second embodiment.

FIG. 10 is an enlarged sectional view of a part of the reducer according to a fifth modification example of the second embodiment. As shown in FIG. 10, the side wall portion 82C of the cover 80C may include a receiving portion 84 that defines a space surrounded by the cover 80C from the side opposite to the top wall portion 81. The receiving portion 84 is disposed at an end of the side wall portion 82C opposite to the end connected to the top wall portion 81. The receiving portion 84 extends toward the valve seat 75 from the intermediate portion of the side wall portion 82C over the entire periphery. In this embodiment, the receiving portion 84 is formed in an annular shape extending downward and inward from the entire periphery of the vertically intermediate portion of the side wall portion 82C. The inner peripheral portion of the receiving portion 84 may extend toward the valve body 71 as it approaches the valve seat 75. An absorber 83 is provided on the inner surface of the receiving portion 84. Thereby it is possible to prevent the lubricant received by the cover 80C from dripping from the cover 80C.

Sixth Modification Example of Second Embodiment

Figure 11:
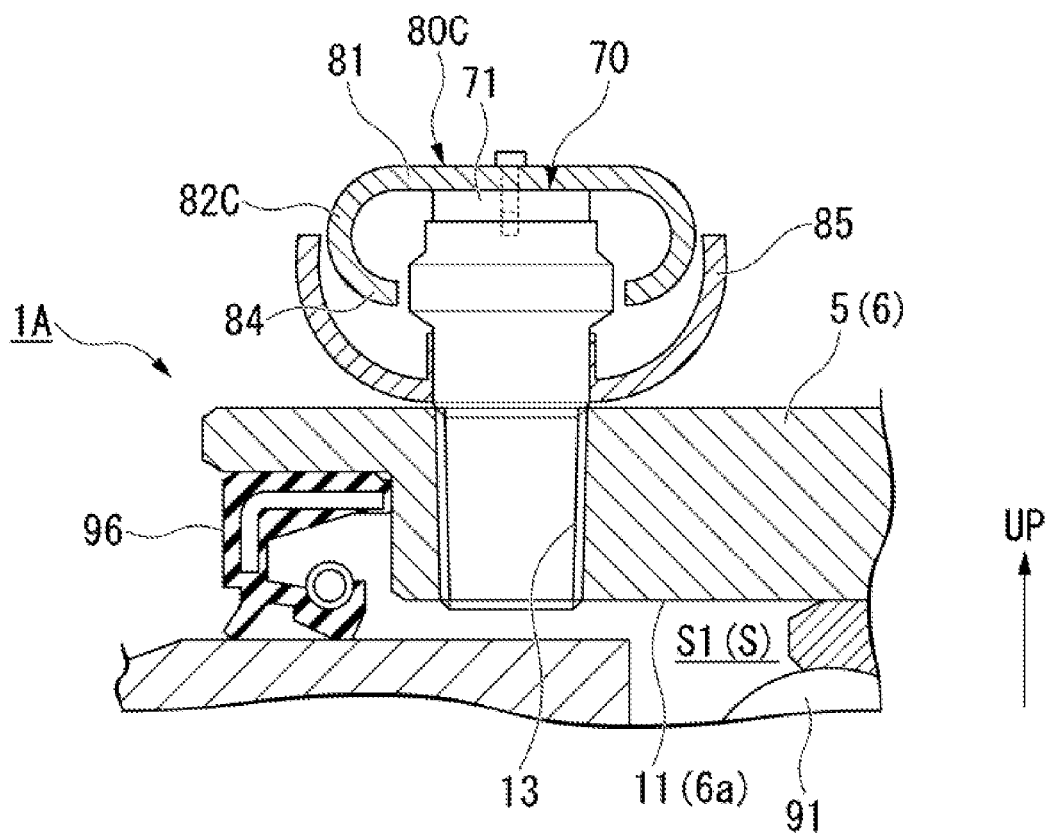
FIG. 11 is an enlarged sectional view of a part of the reducer according to a sixth modification example of the second embodiment.

FIG. 11 is an enlarged sectional view of a part of the reducer according to a sixth modification example of the second embodiment. As shown in FIG. 11, the valve seat 75 protrudes upward from the outer cylinder 5, and a tray 85 that receives the lubricant dripping out of a cover 80C may be provided. The tray 85 is disposed below the cover 80C. The tray 85 is formed in a bowl shape that opens upward. A through hole through which the valve seat 75 is inserted is formed in the center of the tray 85. The tray 85 is supported on the outer periphery of the valve seat 75. The tray 85 is disposed so as to overlap with a gap between the valve seat 75 and the opening of the cover 80C when viewed from the vertical direction. The outer peripheral portion of the tray 85 is disposed above a lower end of the side wall portion 82C and outside the side wall portion 82C. Thereby, even if the lubricant received by the cover 80C drips from the cover 80C, the dripping lubricant is received by the tray 85 and outflow of the lubricant can be prevented.

Third Embodiment

Figure 12:
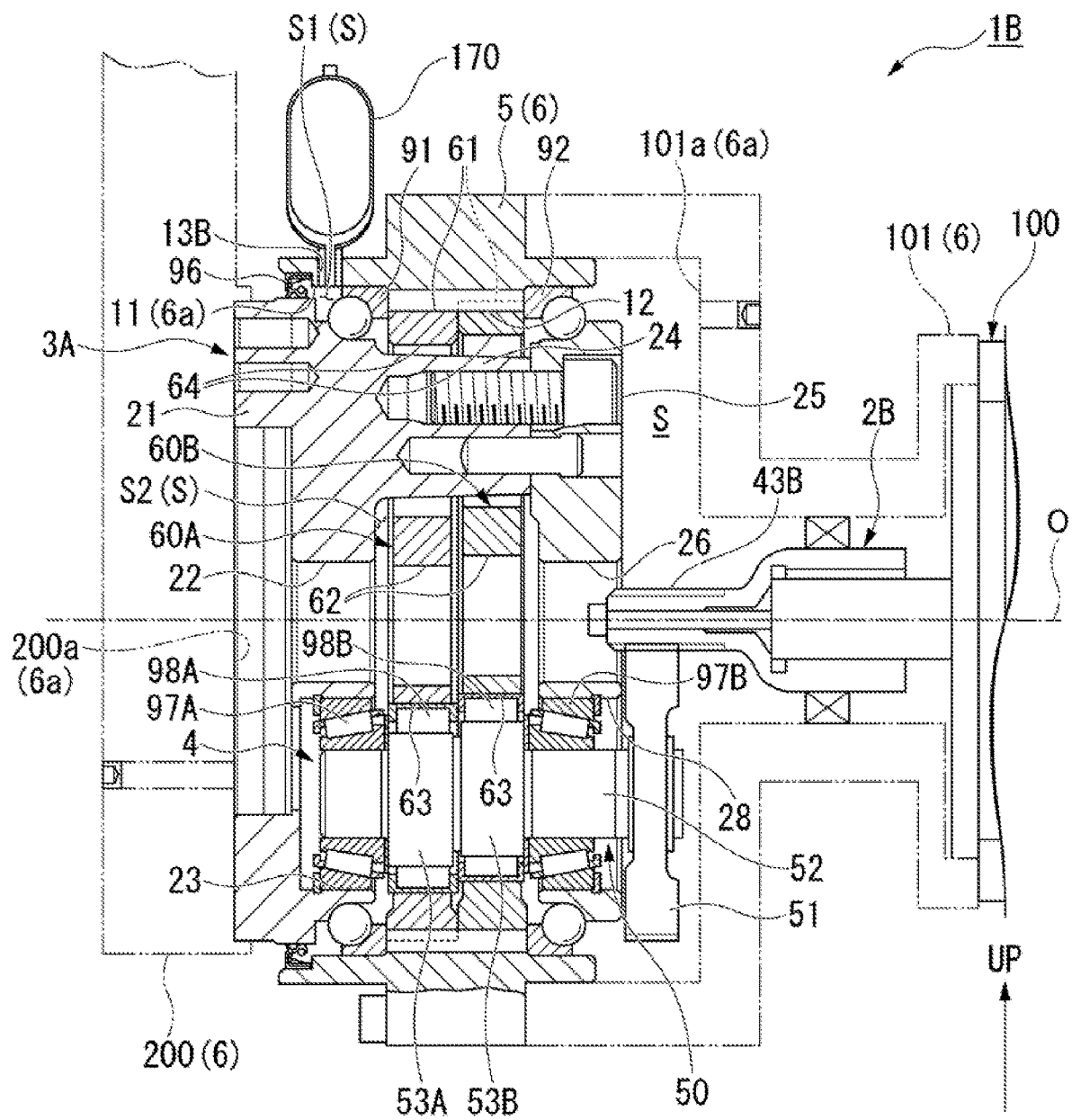
FIG. 12 is a sectional view of a reducer according to a third embodiment of the invention.

FIG. 12 is a sectional view of a speed reducer according to a third embodiment of the invention. The valve 70 is attached in the communication hole 4 in the second embodiment of FIG. 4. Whereas the third embodiment shown in FIG. 12 differs from the second embodiment in that an accumulator 170 is attached in the communication hole 13. Except the features described in detail below, the second embodiment may be configured in the same way as the second embodiment.

As shown in FIG. 12, a speed reducer 1B includes an input shaft 2B as the input part. The input shaft 2B is disposed on the first side in the axial direction with respect to the outer cylinder 5. The input shaft 2B is arranged coaxially with the rotation axis O. A transmission gear 43B that meshes with the crankshaft gear 51 is disposed at an end of the input shaft 2B on the second side in the axial direction. A rotation shaft of a motor 100 described later is coupled to an end of the input shaft 2B on the first axial side.

The motor 100 and a robot arm 200 are attached to the speed reducer 1B. The motor 100 drives the input shaft 2B. A motor housing 101 of the motor 100 is disposed on the first axial side with respect to the reducer 1B. The motor housing 101 is formed in a cylindrical shape, and is disposed so as to enclose the input shaft 2B. The motor housing 101 is coupled to the end of the outer cylinder 5 on the first axial side so as to close an opening on the first axial side of the outer cylinder 5. Thus, the space inside the through hole 26 in the end plate portion 25 of the carrier 3A is sealed by the motor housing 101 from the first axial side. That is, the motor housing 101 is a part of the container 6 having the internal space S. An inner surface 101a of the motor housing 101 is a part of the wall surface 6a that defines the internal space S.

The robot arm 200 is disposed on a side of the motor 100 remote from the motor 100. That is, the robot arm 200 is disposed on the second axial side with respect to the speed reducer 1B. The robot arm 200 is attached to the base portion 21 of the carrier 3A. The robot arm 200 is coupled to an end of the carrier 3A on the second axial side so as to close the through hole 22 in the base portion 21 of the carrier 3A from the second axial side. Thus, the space inside the through hole 22 in the base portion 21 of the carrier 3A is sealed by the robot arm 200 from the first axial side. In other words, the robot arm 200 is a part of the container 6 having the internal space S. A surface 200a of the robot arm 200 facing the first axial side is a part of the wall surface 6a that defines the internal space S.

The reducer 1B includes an accumulator 170 attached in the communication hole 13. The accumulator 170 is configured to accumulate gas and lubricant in the internal space S flowing out through the communication hole 13 and discharge the accumulated gas and lubricant at an appropriate time to the internal space S through the communication hole 13.

The internal-pressure rise prevention mechanism of the speed reducer of the second embodiment described above has the following advantageous effects in addition to the effect same as the second embodiment that the internal pressure rise of the speed reducer 1B can be prevented. According to the third embodiment, it is possible to accumulate gas and lubricant in the internal space S flowing out through the communication hole 13 and discharge the accumulated gas and lubricant at an appropriate time to the internal space S through the communication hole 13. This configuration allows degassing the internal space S through the communication hole 13 while securely preventing the leakage of the lubricant, and the internal pressure rise of the speed reducer 1B can be reduced. Furthermore, it is possible to discharge the accumulated gas and lubricant back to the internal space S when the increased internal pressure starts to decrease, thereby a negative internal pressure can be prevented.

Fourth Embodiment

Figure 13:
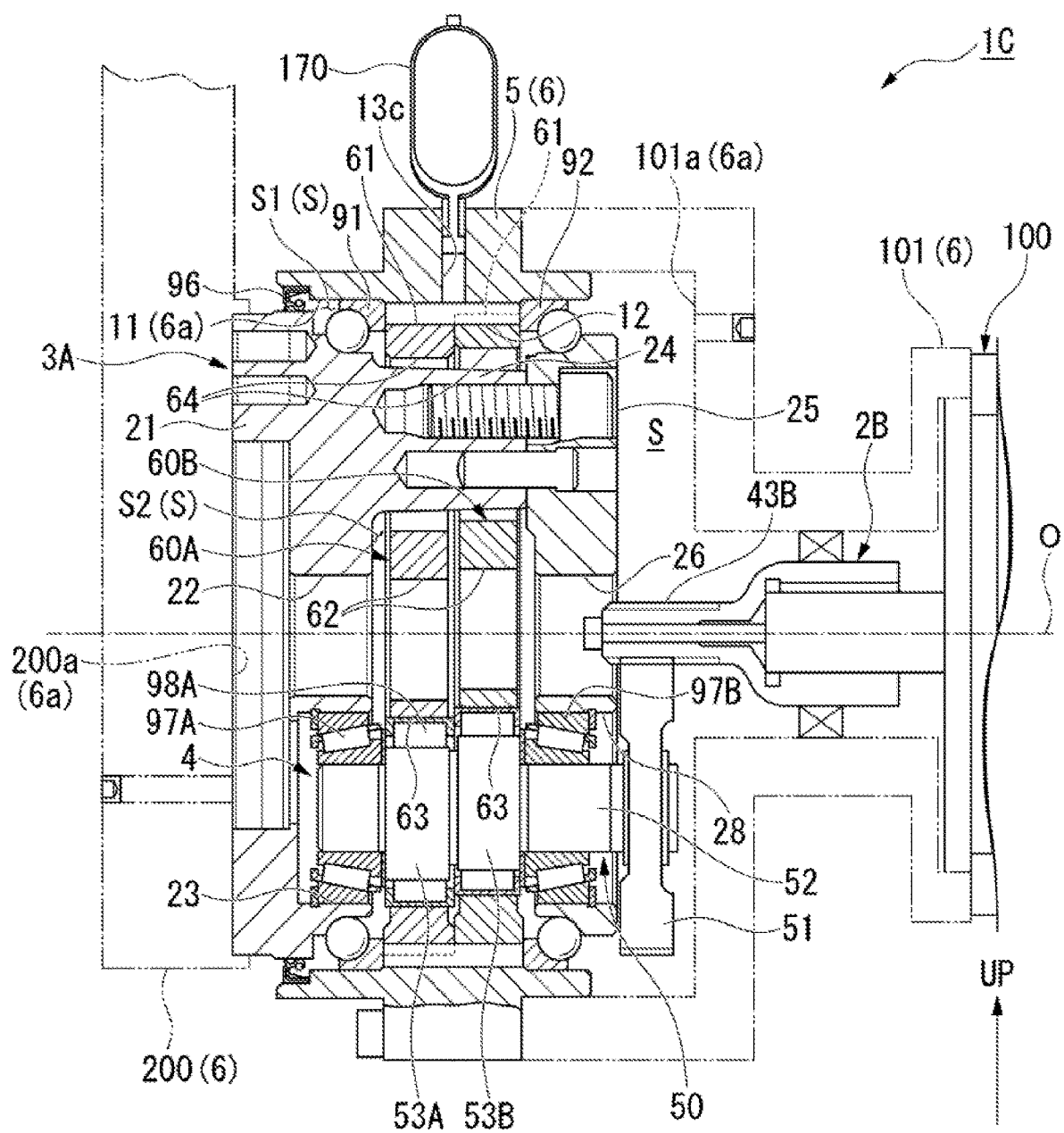
FIG. 13 is a sectional view of a reducer according to a fourth embodiment of the invention.

FIG. 13 is a sectional view of a reducer according to a fourth embodiment of the invention. In the third embodiment shown in FIG. 12, the communication hole 13 is provided between the first main bearing 91 and the oil seal 96 in the outer cylinder 5. Whereas in the fourth embodiment shown in FIG. 13, a communication hole 13C is provided between the first main bearing 91 and the second main bearing 92 in the outer cylinder 5. Except the features described in detail below, the fourth embodiment may be configured in the same way as the third embodiment.

As shown in FIG. 13, the communication hole 13C is opened at an intermediate portion of the inner peripheral surface 11 of the outer cylinder 5 in the axial direction of the inner teeth 12. In other words, it is the same as the above embodiments in that the communication hole 13C opens in the wall surface 6a that defines the internal space S. Although the accumulator 170 is attached in the communication hole 13C in the illustrated example, the valve 70 may be attached instead of the accumulator 170.

This embodiment archives the same advantageous effect as that of the third embodiment that a rise in the internal pressure of the speed reducer 1C can be prevented.

Fifth Embodiment

Figure 14:
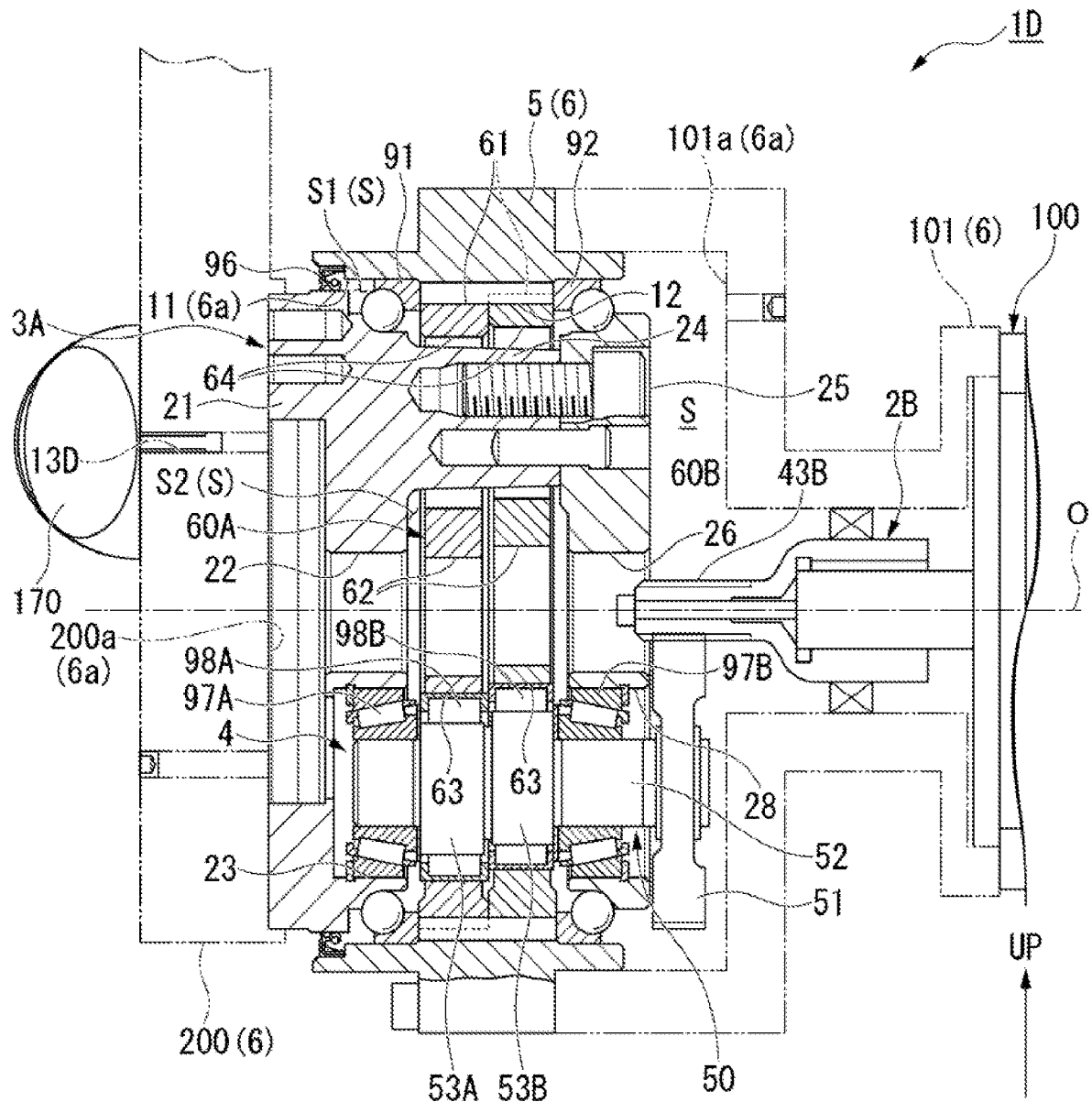
FIG. 14 is a sectional view of a reducer according to a fifth embodiment of the invention.

FIG. 14 is a sectional view of a reducer according to a fifth embodiment of the invention. In the third embodiment shown in FIG. 12, the communication hole 13 is provided in the outer cylinder 5. Whereas the fifth embodiment shown in FIG. 14 differs from the third embodiment in that a communication hole 13D is provided in the robot arm 200. Except the features described in detail below, the fifth embodiment may be configured in the same way as the third embodiment.

As shown in FIG. 14, the communication hole 13D penetrates the robot arm 200 in the axial direction. The communication hole 13D is opened in the surface 200a of the robot arm 200 facing the second axial side and situated on an inner side with respect to the through hole 22 in the base portion 21 of the carrier 3A. In other words, it is the same as the above embodiments in that the communication hole 13D opens in the wall surface 6a that defines the internal space S. Thus the communication hole 13D allows the communication between the internal space S and the external space outside a speed reducer 1D. The communication hole 13D is opened in the surface 200a of the robot arm 200 facing the axial second direction above the level of the lubricant stored in the internal space S. Although the accumulator 170 is attached in the communication hole 13D in the illustrated example, the valve 70 may be attached instead of the accumulator 170.

As described above, the internal-pressure rise prevention mechanism of the speed reducer of the embodiment includes the internal space S accommodating the speed reduction mechanism 4 and the lubricant, and the container 6 having the communication hole 13 opened above the level of the lubricant in the wall surface 6a that defines the internal space S. This embodiment archives the same advantageous effect as that of the third embodiment that a rise in the internal pressure of the speed reducer 1D can be prevented.

Further, the container 6 in the internal-pressure rise prevention mechanism of this embodiment includes the robot arm 200 attached to the carrier 3A. The communication hole 13D is disposed in the robot arm 200. With this configuration, the internal-pressure rise prevention structure can be provided in the speed reducer 1D that does not have the communication hole. Generally, a large operation space for the robot arm 200 is provided on the robot arm 200 side of the speed reducer 1D. Therefore, when the valve 70 or the accumulator 170 is attached in the communication hole 13D, it is not necessary to secure a space for them around the speed reducer 1D as compared with the case where the communication hole is provided in the reducer, which achieves space saving.

Sixth Embodiment

Figure 15:
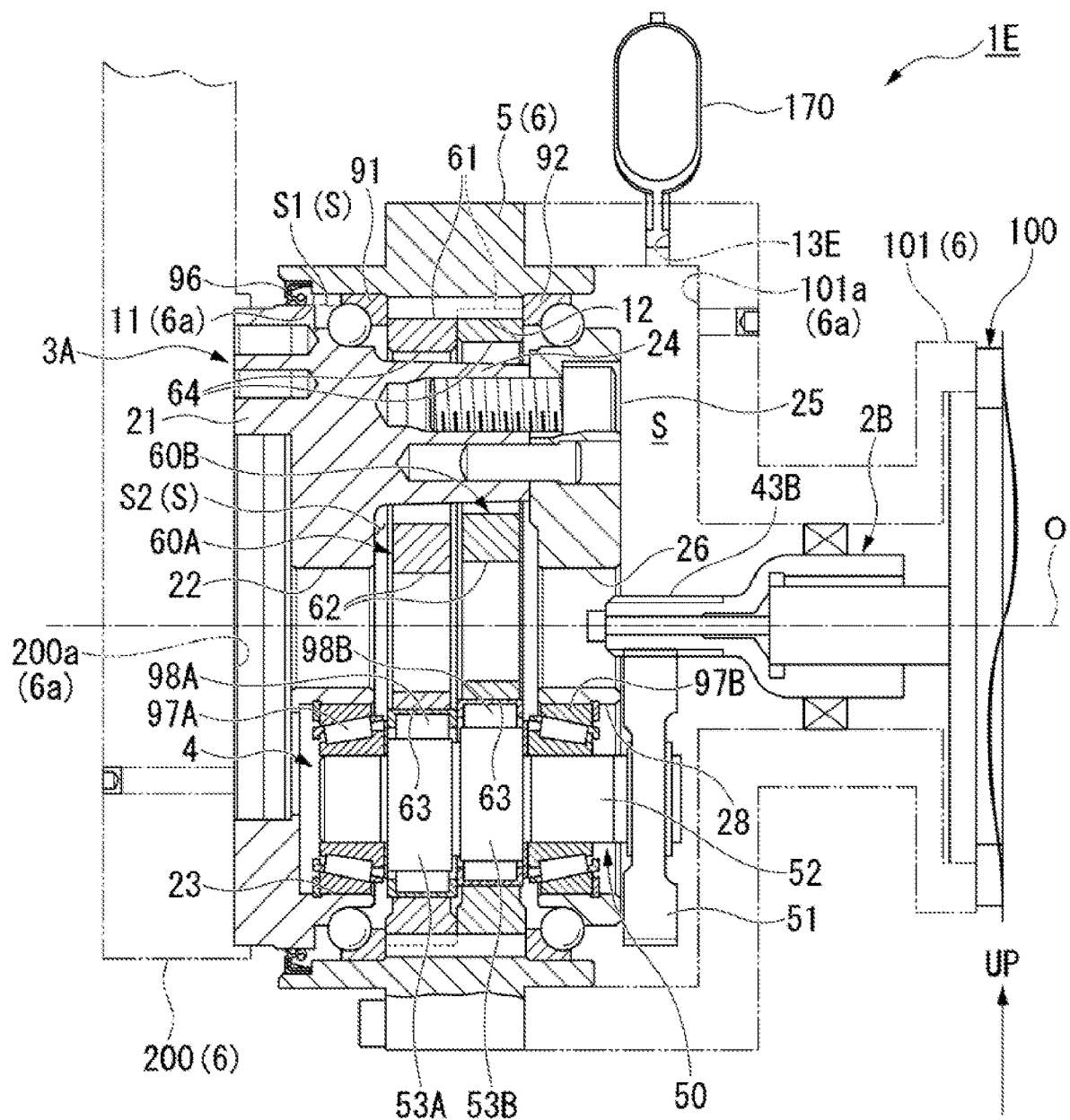
FIG. 15 is a sectional view of a reducer according to a sixth embodiment of the invention.

FIG. 15 is a sectional view of a reducer according to a fifth embodiment of the invention. In the third embodiment shown in FIG. 12, the communication hole 13 is provided between the first main bearing 91 and the oil seal 96 in the outer cylinder 5. Whereas the sixth embodiment shown in FIG. 15 differs from the third embodiment in that a communication hole 13E is provided in the motor housing 101. Except the features described in detail below, the fifth embodiment may be configured in the same way as the third embodiment.

As shown in FIG. 15, the communication hole 13E penetrates the motor housing 101 in the vertical direction. The communication hole 13E is opened in the inner surface 101a of the motor housing 101. In other words, it is the same as the above embodiments in that the communication hole 13E opens in the wall surface 6a that defines the internal space S. Thus the communication hole 13E allows the communication between the internal space S and the external space outside a speed reducer 1E. The communication hole 13E is opened in the inner surface 101a of the motor housing 101 above the level of the lubricant stored in the internal space S. The accumulator 170 is attached in the communication hole 13E. Alternatively the valve 70 may be attached instead of the accumulator 170.

As described above, the internal-pressure rise prevention mechanism of the speed reducer of the embodiment includes the internal space S accommodating the speed reduction mechanism 4 and the lubricant, and the container 6 having the communication hole 13E opened above the level of the lubricant in the wall surface 6a that defines the internal space S. This embodiment archives the same advantageous effect as that of the second embodiment that a rise in the internal pressure of the speed reducer 1E can be prevented.

Further, the internal-pressure rise prevention mechanism of the embodiment includes the outer cylinder 5 rotatably supporting the carrier 3A on the outer peripheral side of the carrier 3A, the motor 100 driving the input shaft 2B, and the motor housing 101 of the motor 100 coupled to the outer cylinder 5. The communication hole 13E is provided in the motor housing 101. With this configuration, the internal-pressure rise prevention structure can be provided in the speed reducer 1E that does not have the communication hole.

Modification Example of Sixth Embodiment

Figure 16:
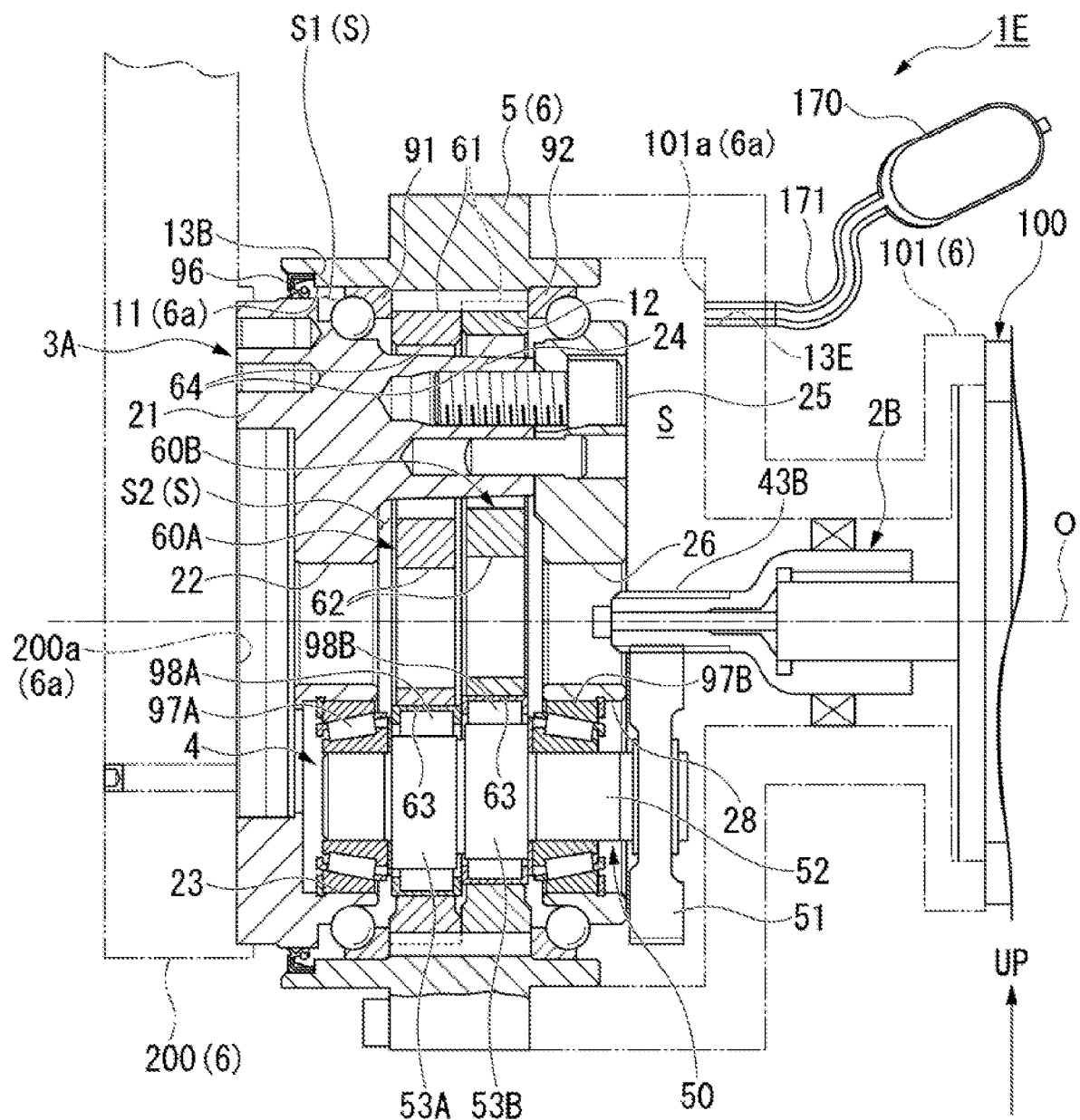
FIG. 16 is a sectional view of the reducer according to a modification example of the sixth embodiment.

FIG. 16 is a sectional view of the reducer according to a modification example of the sixth embodiment. As shown in FIG. 16, the communication hole 13E may penetrate the motor housing 101 in a direction different from the vertical direction. In the illustrated example, the communication hole 13E penetrates the motor housing 101 in the horizontal direction. Further, the accumulator 170 may include a pipe member 171 that is flexible and coupled to the communication hole 13E. Thereby, it is possible to increase the degree of freedom for arrangement of the main body of accumulator 170.

Note that the invention is not limited to the above embodiments described with reference to the accompanying drawings, but various modifications can be technically made within the scope and spirit of the invention. For example, in the above embodiment, the rotation axis O of the output part extends in the vertical direction or the horizontal direction. However, the invention is not limited to this. As long as the communication hole opens above the level of the lubricant, the rotation axis of the output part may be inclined in the vertical direction and/or the horizontal direction.

The features described throughout this disclosure may be adequately replaced by known features or elements without departing from the spirit of the present invention, and the above-described embodiments and modification examples may be appropriately combined.

What is claimed is:

1. An internal-pressure rise prevention structure of a speed reducer, comprising:
   a speed reduction mechanism decelerating rotation of an input part and transmitting the decelerated rotation to an output part;
   a container having a communication hole formed in a wall surface that defines an internal space for accommodating the speed reduction mechanism and lubricant, the communication hole being situated vertically above a level of the lubricant, the communication hole having an inner surface having a step portion;
   a valve attached in the communication hole, the valve comprising a stem;
   a stopper attached to the stem; and
   a spring having a first end and a second end, the first end of the spring being on an inner side of the speed reducer, the second end of the spring being on an outer side of the speed reducer, the spring being disposed within the communication hole so as to surround the stem, the spring biasing the valve in a valve closing direction,
   wherein the first end of the spring is in contact with the stopper, and
   wherein the second end of the spring is in contact with the step portion of the communication hole.

2. The internal-pressure rise prevention structure of a speed reducer of claim 1, further comprising:

a bearing attached on an inner peripheral side of the container;

a first member supported by the container via the bearing;

a second member forming a part of the container and is rotatable relative to the first member about an axis extending in a vertical direction; and a seal member disposed between the first member and the second member vertically above the bearing, wherein the communication hole is disposed in the second member and between the bearing and the seal member.

3. The internal-pressure rise prevention structure of a speed reducer of claim 1, further comprising:

a first member supported by the container such that the first member is relatively rotatable about an axis extending in a horizontal direction; and a second member that is a part of the container, wherein the communication hole is disposed in the second member and vertically above the first member.

4. The internal-pressure rise prevention structure of a speed reducer of claim 1, further comprising a cover enclosing an opening of the valve.

5. The internal-pressure rise prevention structure of a speed reducer of claim 4, further comprising an absorber disposed on an inner surface of the cover to absorb the lubricant.

6. The internal-pressure rise prevention structure of a speed reducer of claim 4, further comprising a tray disposed vertically below the cover.

7. The internal-pressure rise prevention structure of a speed reducer of claim 1, further comprising an accumulator attached in the communication hole.

8. The internal-pressure rise prevention structure of a speed reducer of claim 7, wherein the accumulator includes a pipe member that is flexible and coupled to the communication hole.

9. The internal-pressure rise prevention structure of a speed reducer of claim 1, further comprising:

an outer cylinder that is included in the container and rotatably supports the output part on an outer peripheral side of the output part; and a motor for driving the input part, wherein the container includes a motor housing for the motor, the motor housing is coupled to the outer cylinder, and wherein the communication hole is provided in the motor housing.

10. The internal-pressure rise prevention structure of a speed reducer of claim 1, wherein the container includes a robot arm attached to the output part; and wherein the communication hole is disposed in the robot arm.

* * * * *